(12) United States Patent
Ceresa et al.

(10) Patent No.: US 9,102,996 B2
(45) Date of Patent: Aug. 11, 2015

(54) PROCESSES FOR THE PREPARATION OF STANNIC OXIDE

(75) Inventors: Alan C. Ceresa, Allschwill (CH); Rene Heckendorn, Basel (CH); Elisabeth Scherrer, Hofstetten (CH)

(73) Assignee: GABA International Holding AG, Therwil (CH)

( * ) Notice: Subject to any disclaimer, the term of this patent is extended or adjusted under 35 U.S.C. 154(b) by 0 days.

(21) Appl. No.: 14/367,016

(22) PCT Filed: Dec. 22, 2011

(86) PCT No.: PCT/EP2011/073831
§ 371 (c)(1),
(2), (4) Date: Jun. 19, 2014

(87) PCT Pub. No.: WO2013/091710
PCT Pub. Date: Jun. 27, 2013

(65) Prior Publication Data
US 2014/0370292 A1 Dec. 18, 2014

(51) Int. Cl.
| | | |
|---|---|---|
| C01G 19/00 | (2006.01) | |
| C22B 3/00 | (2006.01) | |
| C01G 19/02 | (2006.01) | |
| B82Y 30/00 | (2011.01) | |
| B82Y 40/00 | (2011.01) | |

(52) U.S. Cl.
CPC ............. *C22B 25/04* (2013.01); *B82Y 30/00* (2013.01); *C01G 19/02* (2013.01); *B82Y 40/00* (2013.01); *C01P 2002/54* (2013.01); *C01P 2004/03* (2013.01); *C01P 2004/32* (2013.01); *C01P 2004/64* (2013.01); *Y10T 428/2982* (2015.01)

(58) Field of Classification Search
None
See application file for complete search history.

(56) References Cited

U.S. PATENT DOCUMENTS

| 4,164,542 A | 8/1979 | Deren |
|---|---|---|
| 2008/0237760 A1 | 10/2008 | Kawashima et al. |

FOREIGN PATENT DOCUMENTS

| EP | 0775764 | 5/1997 |
|---|---|---|
| TW | 418264 | 1/2001 |
| WO | WO 99/046115 | 9/1999 |

OTHER PUBLICATIONS

Ha et al., "Fluorine doped nanocrystalline SnO2 powders prepared via a single molecular precursor method as anode materials for Li ion batteries" J. of Solid State Chemistry, vol. 179, No. 3, Mar. 2006, pp. 702-707.*

Ha H-W et al: "Fluorine-doped nanocrystalline sn02 powders prepared via a single molecular precursor method as anode materials for Li-ion batteries" Journal of Solid State Chemistry, Orlando, FL, US, vol. 179, No. 3, Mar. 1, 2006, pp. 702-707, XP024952272, ISSN: 0022-4596, DOI: 10.1016/J.JSSC.2005.11.002.
Habibzaheh S. et al: "Stability and thermal conductivity of nanofluids of tin dioxide synthesized via microwave-induced combustion route", Chemical Engineering Journal, Elsevier Sequoia, Lausanne, CH, vol. 156, No. 2, Jan. 15, 2010, pp. 471-478, XP026827919, ISSN: 1385-8947.
Han, S.et al.: "Recovery of Indium from Indium/Tin Oixdes Scrap by Chemical Precipitation", Geosystem Eng., vol. 5, No. 4, 2002, pp. 93-98, XP009161162, cited in the application Section "Results and Discussion" Subsections "precipitation Behavior of Tin Oxides" and "Addition of Sodium Nitrite at pH 2.7".
International Search Report and the Written Opinion issued in International Application PCT/EP2011/073831 mailed Aug. 8, 2012.
Kim et al., "Preparation of nanosize SnO2 particles in an aerosol reactor by pyrolsys of tetrabutyl tin," Journal of Material Science, vol. 34 (1999) pp. 5783-5788. US.
Liu H et al: "Tin Oxide nanoparticles synthesized by gel combustion and their potential for gas detection" Ceramics International, Elsevier, Amsterdam, NL, vol. 35, No. 3, Apr. 1, 2009, pp. 961-966, XP025915284, ISSN: 0272-8842, DOI: 10.1016/J.Ceramint.2008.04.010.
Muthuvinayagam A et al: "Investigation on mild condition preparation and quantum confinement effects in semiconductor nanocrystals of Sn02", Physica b. Condensed Matter, Amsterdam, NL, vol. 405, No. 4, Feb. 15, 2010, pp. 1067-1070, XP026853238, ISSN: 0921-4526.
Raschig: "Uber di Einwirkung vo Zinnchlorur auf salpetrige Saure", Zeitschrift Fur Anorganische Und Allgemeine Chemie, vol. 155, 1926, pp. 225-240, XP002679947, cited in the application p. 227.
Cao Xue-zeng et al, 2002. "Preparation of tin dichloride and sodium stannate from electroplate tin wastelug", Research Institute of Applied Chemistry 31(3):38-40.
Gerhard-Inger et al., 2008, "Fluorine Doped Tin Oxide Coatings—Over 50 Years and Going Strong," Key Engineering Materials 380:169-178.
Graf et al., 2006, "Microfabricated gas sensor systems with sensitive nanocrystalline metal-oxide films," Journal of Nanoparticle Research 8:823-839.
Haight et al., 1962, "The Mechanism of the Reduction of Nitrate," Acta Chem. Scand. 16(1 ):221- 278.
Hong et al., 2006, "Improvement in the Long-Term Stability of SnO2 Nanoparticle Surface Modification with Additives," Journal Korean Physical Society 48(6):1390-1394.
Senthilkumar et al., 2009, "Synthesis of fluorine doped tin oxide nanoparticles by Sol-Gel technique and their characterization," J. Of Sol-Gel Science and Technology 53(2):316-321.

* cited by examiner

*Primary Examiner* — Steven Bos
(74) *Attorney, Agent, or Firm* — Howard C. Lee

(57) ABSTRACT

Disclosed herein are processes for oxidising $Sn^{2+}$ dissolved in an aqueous solution to stannic compounds using $NO_2$ and optionally $O_2$ as oxidants, wherein the aqueous solution is kept at a pH in the range of 0 to 7, wherein a salt $Sn^{2+}(X^{n-})_{2/n}$ and the oxidants are used according to the reaction scheme a $Sn^{2+}(X^{n-})_{2/n}$ +b $O_2$+c $NO_2-\rightarrow$stannic compounds in which scheme a, b and c are mole numbers; with the proviso that when b is essentially zero, then the aqueous solution is essentially free of $Cl^-$, $HSO_4^-$ and $SO_4^{2-}$.

9 Claims, 1 Drawing Sheet

PROCESSES FOR THE PREPARATION OF STANNIC OXIDE

BACKGROUND

SnO$_2$ (stannic oxide) has been used for quite some time in transparent electrodes and in gas sensors. For these purposes it is applied in the form of a thin layer onto a substrate. The SnO$_2$ layer may be formed in a single step by thermolysis of a spray-deposited layer containing a suitable tin compound as the precursor for the SnO$_2$. This type of layer, frequently applied to glass as the substrate, is in particularly suitable for transparent electrodes, as e.g. used in solar panels. Alternatively the SnO$_2$ may be applied as preformed nanoparticles, e.g. as a dispersion, onto the substrate which is then again thermolysed to sinter together the preformed nanoparticles to a thin layer having a high specific surface derived from the surface of the nanoparticles. This type of layer, if applied to an electrode as the substrate, is particularly suitable for gas sensors.

SnO$_2$ is quite insoluble in aqueous solvents of neutral to weakly acidic pH. Preformed SnO$_2$ might thus be obtained by precipitation of an initially strongly acidic solution of a soluble stannic ion-containing salt by alkalinisation. The excess acid upon neutralisation however forms an excess of salt which might be incorporated into the precipitated SnO$_2$. A more convenient way is then to start from stannous ion-containing salts. These have higher solubilities at only weakly acidic pH, but on the other hand they require an oxidation step from the stannous to the stannic oxidation state before the SnO$_2$ can be precipitated. A very common and known such oxidant for stannous ions is atmospheric oxygen. Uncatalyzed oxidation of stannous ions by oxygen is relatively slow, its half life time is in the order of magnitude of some hours or days. In such a case the insoluble precipitated SnO$_2$ forms crystalline structures. On the other side, if the oxidation of stannous ions is very fast (e.g. with a half-life time in the order of magnitude of microseconds or even nanoseconds), the spontaneous formed particles of SnO$_2$ are no more able to form defined crystalline structures. The particles of SnO$_2$ then tend to remain as nano-sized particles suspended or dispersed in the aqueous medium. Fast oxidation of stannous ions may be achieved either by a fast stoichiometric oxidant or by a catalytically accelerated oxidation by oxygen.

It was observed by Raschig in "Zeitschrift für anorganische and allgemeine Chemie" (Journal for inorganic and general chemistry), 155, pp. 225-240, 1926, that stannous ions derived from SnCl$_2$ could be quickly oxidized by nitrite to a hydroxo-containing stannic species. These studies were however done under exclusion of air, thus under removal of athmosperic oxygen, since the aqueous SnCl$_2$ solutions were freshly prepared from metallic tin and hydrochloric acid. They were also done at a molar ratio of stannous ion to nitrite of 1:1. Raschig did not observe the formation of a precipitate of SnO$_2$ under his conditions. In view of the manufacture of his SnCl$_2$ with hydrochloric acid this might be due to the still markedly acidic pH of his reaction solution, which prevented the precipitation (see also following paragraph).

Acta Chem. Scand. 16(1), pp. 221-228, 1962, discloses that under strongly acidic conditions of 3M HCl or 2M H$_2$SO$_4$ nitrite also oxidizes stannous chloride to stannic species. This publication again used oxygen-free media (the solutions were bubbled at all times with oxygen-free nitrogen, see middle of page 222). Also, under such acidic conditions no SnO$_2$ could have precipitated, as is evidenced by a more recent publication, Geosystem Eng. 5(4), pp. 93-98, 2002, in its FIGS. 4, 6 and in particular 8.

U.S. Pat. No. 4,164,542 A describes a process for detinning tin-plated scrap in which the coat of metallic tin is dissolved in a strongly alkaline solution containing 18-30% sodium hydroxide and 2-10% sodium nitrite at temperatures of up to 236° F. to form sodium stannate. It is assumed that this process intermediately forms stannous ions from the tin metal, which are then further oxidized to the sodium stannate. The sodium stannate is then precipitated by cooling; the precipitate is addressed as "sodium stannate crystals".

For the use of SnO$_2$ as a semiconducting layer in the above mentioned applications it is advantageous to increase its conductivity, which has commonly been done by doping it with other elements such as indium, antimon, cobalt, manganese and in particular fluorine. Fluorine-doped SnO$_2$ coated glass has been recognized as a cheap alternative to indium doped SnO$_2$ because it is quite stable under atmospheric conditions, chemically inert, mechanically hard, high-temperature resistant and has a high tolerance to physical abrasion. A long-known process for preparing fluorine-doped SnO$_2$ coated glass is by spraying an aqueous solution of stannic species also containing HF onto the glass which is pre-heated to several hundred degrees, which dries and calcines the sprayed layer to obtain the fluorine-doped SnO$_2$ coated glass (see e.g. Key Engineering Materials 380, pp. 169-178, 2008). In later publications concerning fluorine doped SnO$_2$ semiconductive layers the sprayable solution has customarily been made by mixing an alcoholic SnCl$_4$ pentahydrate solution and an aqueous NH$_4$F solution. The employed molar amount of fluoride (as HF or as NH$_4$F) has been typically in the range of 0.5 up to 8 times the molar amount of tin (see e.g. Example 2, paragraph 64 of US 2008/0237760). Nanoparticulate fluorine doped SnO$_2$ was prepared in a recent publication (J. Sol-Gel. Sci. Technol. 53, pp. 316-321, 2010) nanoparticulate fluorine doped by the sol-gel technique using SnCl$_2$, HF and ammonia in a mixed aqueous/methanolic/acetylacetone solvent to obtain the gel, followed by filtration, washing free from chlorine ions until a test with AgNO$_3$ solution did not form any AgCl precipitate, and calcination at 600-700° C. This publication did not use any explicitly added oxidants.

Generally, the prior art known to the inventors or the applicant studied the oxidation of stannous ions either by nitrite or by atmospheric oxygen. Insofar as it studied the oxidation by nitrite it is silent as to the reaction mechanism of the oxidation. If in the prior art a stannous ion-containing salt was used for preparing precipitated nanoparticulate SnO$_2$, then according to the knowledge of the inventors and the applicant it was always the cheap and easily available SnCl$_2$.

The instant invention aims to provide an improved process for the oxidation of stannous ions to stannic compounds, in particular for the preparation nanoparticulate SnO$_2$.

SUMMARY

The following are thus objects of the invention:
(1) A process for oxidising Sn$^{2+}$ dissolved in an aqueous solution to stannic compounds using NO$_2^-$ and optionally O$_2$ as oxidants, said dissolved Sn$^{2+}$ being obtained from a salt Sn$^{2+}$(X$^{n-}$)$_{2/n}$, wherein X$^{n-}$ denotes a counter anion and n is an integer of 1 to 2; wherein during said oxidation said aqueous solution is kept at a pH in the range of 0 to 7, and said salt Sn$^{2+}$(X$^{n-}$)$_{2/n}$ and said oxidants are used according to the reaction scheme a Sn$^{2+}$(X$^{n-}$)$_{2/n}$+b O$_2$+c NO$_2^- \rightarrow$ stannic compounds in which scheme a, b and c are mole numbers; with the proviso that when b is essentially zero, then said aqueous solution is essentially free of Cl$^-$, HSO$_4^-$ and SO$_4^{2-}$.

(2) The process of above (1), wherein c is 0.05 to 0.5 times of a, and b is greater than zero.
(3) The process of above (2), wherein b is at least equal to the difference a-c.
(4) The process of above (2) or (3), wherein $Sn^{2+}(X^{n-})_{2/n}$ is selected from the group consisting of $SnF_2$, $SnCl_2$, $SnBr_2$ and $SnI_2$.
(5) The process of above (4), wherein $Sn^{2+}(X^{n-})_{2/n}$ $SnF_2$.
(6) The process of above (1), wherein b is essentially zero, c is 0.5 to 1.5 times of a, and $Sn^{2+}(X^{n-})_{2/n}$ is $SnF_2$.
(7) The process of one of above (1) to (6), wherein the pH is kept in the range of 0 to 3.5, provided that the pH is kept low enough to obtain soluble stannic compounds dissolved in the solution and to prevent precipitate formation.
(8) The process of one of above (1) to (6), wherein the pH is kept in the range of 2.0 to 6, provided that the pH is such as to precipitate nanoparticulate $SnO_2$.
(9) The process of above (8), wherein $Sn^{2+}(X^{n-})_{2/n}$ is $SnF_2$.
(10) The process of above (9), wherein the solution is purely aqueous.
(11) The process of above (10), which is performed at a temperature of 20 to 30° C.
(12) A nanoparticulate $SnO_2$ consisting of spherical particles with average particle diameter of 20 to 30 nanometers and with a standard deviation of the particle diameter of 4 to 8 nanometers; and/or which is obtainable according to the process of above (8).
(13) The nanoparticulate $SnO_2$ of above (12), which is doped with fluoride ions and which is obtainable by the process of one of above (9) to (11).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
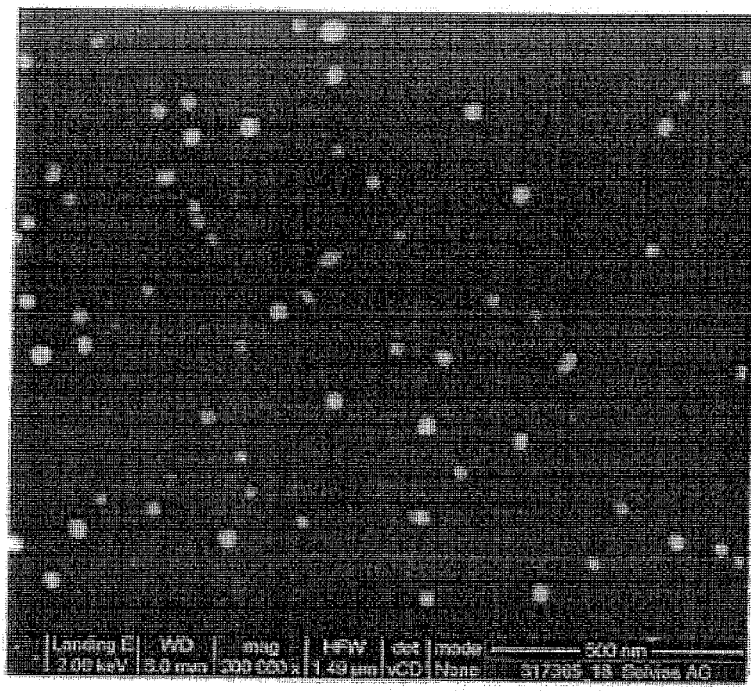
FIG. 1 shows a scanning electron microscope (SEM) image of nanoparticulate $SnO_2$ prepared starting from $SnF_2$ (according to the invention)

The following description of the preferred embodiment(s) is merely exemplary in nature and is in no way intended to limit the invention, its application, or uses.

It was unexpectedly observed that when a less than equimolar amount of $NO_2^-$ with respect to the stannous ion salt to be oxidised is used (i.e. c<a, e.g. c=0.1 a) and the reaction medium is not oxygen-free, then there is nevertheless about 40-50 mol % conversion of the stannous ions to precipitable nanoparticulate $SnO_2$. This is indicative of a catalytic oxydation process in which the oxygen acts as the primary oxidant. Without wishing to be bound by theory it is assumed that either the nanoparticulate $SnO_2$ formed under such precipitation conditions, or the $NO_2^-$, or an unknown intermediate thereof, or a combination of two or more of these, catalyzes the otherwise very slow (days to weeks) oxidation of stannous ions by atmospheric oxygen. It was also unexpectedly observed that when stannous ions are employed as their $SnF_2$ salt, then a well-shaped, sperical, non-agglomerated nanoparticulate fluoride-doped $SnO_2$ can be precipitated.

In the process of the invention a stannous ion salt $Sn^{2+}(X^{n-})_{2/n}$ is used. This may, but need not be, an ionic such salt, provided it has sufficient solubility in the aqueous solution, i.e. has a solubility of at least 0.1 g per 100 ml of the solution at room temperature. Examples therefor are salts with single charged (n=1) or double charged (n=2) counter anions not having appreciable oxidising or reducing effect on stannous ion, and preferably not having appreciable chelating property on stannous ions. Examples for single charged counter anions $X^-$ are halide anions (e.g. chloride, bromide, iodide, fluoride), nitrate, acetate, hydrogen sulphate or hydrogen carbonate. An example for a double charged conter anion $X^{2-}$ is sulphate.

The process of the invention also uses nitrite. This may be used in the form of any nitrite salt being sufficiently soluble in the aqueous solution, i.e. having a solubility of at least 0.1 g per 100 ml of solution at room temperature. Preferred are alkali metal salts of nitrite, such as $NaNO_2$ and $KNO_2$, more preferable is $NaNO_2$.

The process of the invention optionally also uses oxygen. This may be pure oxygen gas or air, preferably it is pure oxygen. The oxygen may be dissolved under agitation or stirring of a solution being in contact with an oxygen-containing gas phase, or by bubbling oxygen or an oxygen-containing gas into the solution.

The molar numbers a, b and c in the reaction scheme relate to the amounts of starting materials employed. The molar number a thus relates to the employed amount of stannous ion salt $Sn^{2+}(X^{n-})_{2/n}$. The molar number b relates to the total amount of dissolved oxygen gas that is initially present in the reaction solution and, optionally, is further re-dissolved in the solution. It is obvious that at any time the mole number of oxygen gas dissolved in the reaction solution cannot exceed the product of the oxygen saturation concentration [in mol/l] in that solution, multiplied by the volume of that solution [in 1]. If b is desired become greater that this product, then re-dissolving of further oxygen gas into the reaction medium as described above may be done, once the concentration of oxygen gas in the reaction solution has fallen below said saturation concentration due to its consumption by the inventive oxidation process.

The molar number quotients b/a and c/a are not necessarily "rational" numbers (in the mathematical sense). These quotients may be any real (in the mathematical sense) positive numbers. This is on the one hand because nitrite and oxygen may be employed in arbitrary, real-numbered molar excesses $e_2$ and $e_1$, respectively, over the initial amount of stannous ion salt $Sn^{2+}(X^{n-})_{2/n}$. This is on the other hand because in the process of the invention the conversion of stannous ions to stannic compounds is believed to run according to at least one predominant stoichiometric oxidation reaction, consuming 1 mole of nitrite per 1 mol of oxidized stannous ions, and according to at least one predominant catalytical oxidation reaction, believed to consume 0.5 mol of oxygen per 1 mol of oxidized stannous ions. If one assumes the mole number of stannic compounds formed over the said predominant stoichiometric oxidation reaction as s, and the mole number of stannic compounds formed over the said predominant catalytic oxidation reaction as t, then:

$$b/a=(0.5t+e_1)/(s+t), c/a=(s+e_2)/(s+t).$$

The quotient c/a is always greater than zero, since nitrite is always employed to some extent according to the invention.

The $Sn^{2+}(X^{n-})_{2/n}$ is preferably used in a molar amount a such that its concentration in the reaction solution is typically in the range of about 1 millimolar to about 0.2 molar, preferably about 0.05 molar to about 0.2 molar. If it is intended to keep the formed stannic compounds dissolved (see below) then a rather lower concentration may be chosen. If it is intended to form a precipitate of nanoparticulate $SnO_2$ (see below), then a rather higher concentration may be chosen.

For the reaction of the invention the salt $Sn^{2+}(X^{n-})_{2/n}$ and the nitrite are generally used in a form dissolved in the aqueous solvent. It is preferred that the salt $Sn^{2+}(X^{n-})_{2/n}$ and the nitrite be individually pre-dissolved in the reaction solvent before they are brought into contact with each other. The solvents for pre-dissolving the salt $Sn^{2+}(X^{n-})_{2/n}$ and the nitrite need not be the same, but preferably they are the same. The $Sn^{2+}(X^{n-})_{2/n}$ solution may be added to the nitrite solution or vice versa. The rate of addition is not critical, but in one preferred embodiment one solution is poured at once into the other solution. In this latter case it is more preferred to add the $Sn^{2+}(X^{n-})_{2/n}$ solution to the nitrite solution. The addition of any required oxygen may be allowed for by performing the oxidation reaction in an open vessel, or even under bubbling of oxygen gas into the reaction medium.

In some embodiments of the process the mole number b is greater than zero, e.g. b is at least 0.05 times of a, i.e. at least 5 mol % $O_2$ is used with respect to the molar amount of $Sn^{2+}(X^{n-})_{2/n}$. Preferably, b is then such that it is at least equal to the difference of a-c. In this case, the quotient of c/a is preferably in the range of about 0.05 to about 0.5; more preferably in the range of about 0.3 to about 0.4. In this embodiment any of the above mentioned salts $Sn^{2+}(X^{n-})_{2/n}$ may be used, but preferred are the halogenide salts $SnF_2$, $SnCl_2$, $SnBr_2$ and $SnI_2$. Most preferred is $SnF_2$. This embodiment is a predominantly catalytical oxidation process with oxygen as the primary oxidant. In this embodiment the aqueous solution may be, but need not be essentially free of $Cl^-$, $SO_4^{2-}$ and $HSO_4^-$.

In other embodiments of the process b is essentially zero, meaning in the context of the invention that no oxygen gas is explicitly added, and furthermore preferably, that the reaction solution has been depleted of oxygen gas, e.g. by bubbling with an inert gas such as nitrogen or argon, to a residual oxygen concentration of 5% or less, preferably 1% or less of the above mentioned saturation concentration. The residual oxygen concentration in the solution may be determined e.g. by calibrated gas chromatography or by polarography. In some embodiments, the quotient c/a is preferably in the range of about 0.5 to about 1.5; more preferably in the range of about 1.0 to 1.3, particularly preferably it is about 1.2. This is an embodiment of a predominantly stoichiometric oxidation by nitrite. In this case the preferred salt $Sn^{2+}(X^{n-})_{2/n}$ is $SnF_2$. In some embodiments, no other types of counter anions, besides the $X^{n-}$ derived from the salt $Sn^{2+}(X^{n-})_{2/n}$ and the nitrite, or chelants for stannous ions or stannic ions are added to the reaction solution.

As used herein, "essentially free of chloride ions" is intended to mean a solution which, when mixed at a 1:1 volume ratio at room temperature with a 0.01 M aqueous $AgNO_3$ solution, does not give a visible precipitate of AgCl.

As used herein, "essentially free of hydrogen sulphate and sulphate ions" is intended to mean a solution which, when mixed at a 1:1 volume ratio at room temperature with a 0.01 M aqueous $BaCl_2$ solution, does not give a visible precipitate of $BaSO_4$.

In some embodiments, the processes of the invention are run in an aqueous solution.

As used herein, "aqueous solution" is intended to mean a solution wherein the solvent is water and, optionally, 0 to 20 volume percent, based on the volume of the water, of an admixed alcohol selected from the group consisting of methanol, ethanol and propanol. In some embodiments, the solvent is water without any alcohol cosolvents. This also applies to the solvent(s) used for pre-dissolving the salt $Sn^{2+}(X^{n-})_{2/n}$ and the nitrite (see above).

In some embodiments the process is run at about room temperature, i.e. at a temperature of about 10 to 30° C., preferably of about 20 to 25° C.

In the process of the invention the stannous ions are oxidized to "stannic compounds". This is in the context of the invention a generic term intended to encompass all Sn(IV) containing compounds that could be formed, whether dissolved or precipitated, in the aqueous reaction solution. These are e.g. hydroxo complexes $Sn(OH)_x^{(4-x)+}$ wherein x is 0 to 3 (0 is improbable due to the strong tendency of Sn(IV) to hydrolyze), or such complexes where one or more of the coordinated hydroxy groups are substituted with other counter anions present in the solution, Sn(IV) tetrahalides such as in particular, when $X^{n-}$ is fluoride, stannic tetrafluoride, and $SnO^{2+}$ or $SnO(OH)^+$ and their hydrated forms. All these stannic compounds may be converted one into the other, their respective concentrations depending, among others, on the solvent, the pH, the temperature, and the kinetics and thermodynamics of the involved conversion reactions. The foregoing stannic compounds are also probable but non-exclusive examples of stannic compounds considered "soluble" in the context of the invention. Stannic compounds considered "insoluble" in the context of the invention are $SnO_2$ and hydrated forms thereof, i.e. $SnO_2.nH_2O$, wherein n is e.g. 1 to 4, in particular 2, such as $SnO_2.2H_2O$, which could also be written as $Sn(OH)_4$.

In the process of the invention $NO_2^-$ is eventually converted to other nitrogen-containing products. They are mainly nitrogen oxides such as $N_2O$, NO and $NO_2$, but other species may also be present to some extent.

The process of the invention is run at a pH in the range of 0 to 7. This range is generally automatically achieved from the presence of the reactants and the solvent alone, without requiring extra acid, extra base and/or buffering reagents.

In some embodiments, the pH is kept in a range of 0 to 3.5, and is kept at such a low pH value that no precipitate forms, i.e. that only soluble stannic compounds such as exemplified above are present. In the case where $X^{n-}$ is $F^-$ the pH is kept more preferably within a range of 1.0 to 2.0 and low enough that no precipitate forms. In the case where $X^{n-}$ is $Cl^-$ the pH is preferably kept within a range of 0.0 to 1.0 and low enough that no precipitate forms. A lowering of the pH within these ranges may be achieved by an excess of salt $Sn^{2+}(X^{n-})_{2/n}$, which forms acidity upon dissolving, or by adding an acid, in particular the acid having the same conjugate base anion $X^{n-}$ as the starting salt $Sn^{2+}(X^{n-})_{2/n}$ (such as HF or HCl when the starting salt is $SnF_2$ or $SnCl_2$, respectively), or $HNO_3$. An increase of the pH within these ranges may be achieved by adding alkali metal hydroxide having preferably the same alkali metal cation as in the above mentioned alkali metal salt of the nitrite. Specifically if X is then also alkali metal fluoride may be employed, again preferably having the same alkali metal cation as in the above mentioned alkali metal salt of the nitrite. After completion of the oxidation reaction this clear reaction solution without precipitate may be used as such as a spraying solution in the preparation of $SnO_2$ semiconductive layers by spray-coating as mentioned in the introduction. If such $SnO_2$ semiconductive layer is intended to be of fluoride doped $SnO_2$, then firstly $SnF_2$ is preferred as the starting salt $Sn^{2+}(X^{n-})_{2/n}$. In this case it is secondly also preferred to keep the pH of the oxidation reaction solution in the above range of 1.0 to 2.0 and so low that no precipitate forms, if necessary by using a concentrated solution of HF in water (=hydrofluoric acid), e.g. with 20 to 52 wt %, preferably 30 to 50 wt %, HF based on the solution. These two preferred features allow to have rather large amounts of fluoride, in the same typical amount ranges with respect to tin as has previously been done in the production of fluoride doped $SnO_2$ semiconductive layers (see the introduction). These two preferred features also allow to provide a spraying solution essentially free of chloride ions in the above sense, or even totally free of chloride ions, so that the fluoride doped $SnO_2$ semiconductive layer obtained therefrom after calcination is also devoid of chloride. For an exemplary process for preparing a $SnO_2$ semiconductive layer by spray-coating and calcination which may analogously be applied here reference is made to page 171 middle of cited Key Engineering Materials 380, pp. 169-178, 2008.

In another preferred embodiment the pH is kept in a range of 2.0 to 6, and is kept such that insoluble stannic compounds in the foregoing sense precipitate out of the solution. In the case where $X^{n-}$ is $F^-$ the pH is kept more preferably within a range of 3.0 to 5.0 and is kept such that the insoluble stannic compounds precipitate out of the solution. In the case where $X^{n-}$ is $Cl^-$ the pH is kept more preferably within a range of 0.0 to 1.0 and low enough that no precipitate forms. In the case where $X^{n-}$ is $Cl^-$ the pH is kept more preferably within a range of 2.0 to 4.0 and is kept such that the insoluble stannic compounds precipitate out of the solution. The insoluble stannic compounds precipitate immediately in the form of nanoparticulate $SnO_2$ which, if fluoride is present in the solution, may also contain fluoride. The pH of the oxidation solution may again be controlled as exemplified above. The amount of dopant fluoride may be controlled within a useful range of 0 to about 4% by weight, by optionally also adding further fluoride to the reactions solution, such as in the form of alkali metal fluoride or HF. The nanoparticulate $SnO_2$, optionally fluorine-doped, may be separated from the reaction solution by physical separation methods such as filtration, sedimentation/decantation of supernatant, or centrifugation. The precipitate may then be dried and used for gas sensors as described in the introduction and in analogy to known processes. Reference is made to Journal of Nanoparticle Research, 8, pp. 823-839 (2006) and the literature cited therein.

The differences in morphology of the nanoparticulate $SnO_2$ formed from $SnCl_2$, as done in the prior art, or when formed from $SnF_2$, as in the instant invention, are quite striking. FIG. 1 shows a scanning electron microscopic photograph of the precipitate from $SnF_2$ under 200 000 times magnification. This precipitate consists of single, non-agglomerated, apparently amorphous particles which are typically almost regularly shaped, namely almost spherical. The non-aggregation of these particles is believed to be due to the absence of marked amounts of chloride ions in the precipitation medium; unexpectedly the fluoride counter ions do not seem to provide such agglomeration. These almost spherical particles may have a typical average particle diameter of about 20 to about 30 nanometers. They may have typical particle diameters ranging from about 9 to about 55 nanometers. Alternatively they may have a standard deviation of the particle diameter of about 4 to 8 nanometers. Preferably the particles of this precipitate have an average particle size of about 20 to about 30 nanometers and particle diameters ranging from about 9 to about 55 nanometers. Alternatively, said spherical particles preferably have a standard deviation of the particle diameter of about 4 to 8 nanometers and an average particle size of about 20 to about 30 nanometers. Dissolution of this nanoparticulate $SnO_2$ in hydrochloric acid and fluoride determination with a fluoride-sensitive electrode shows that it contains typically, depending on the reaction conditions, about 0.5 to about 4% by weight of dopant fluoride. It is also observed that when the precipitate is formed with a molar amount c of nitrite which is smaller than the molar amount a of $Sn^{2+}(X^{n-})_{2/n}$, such as to have a quotient c/a in the range of 0.3 to 0.6, then the precipitate may initially have a yellow colour, believed to be due to the absorption of some gaseous nitrogen oxides as exemplified above. The yellow colour disappears upon drying of the precipitate, such as for about 1 hour at 50° C., which is indicative that the precipitate is able to reversibly absorb such nitrogen oxides. The said amorphous character of the precipitate appears to persist after such drying, as can be evidenced by Debye-Scherrer powder X-ray measurement.

Figure 2:
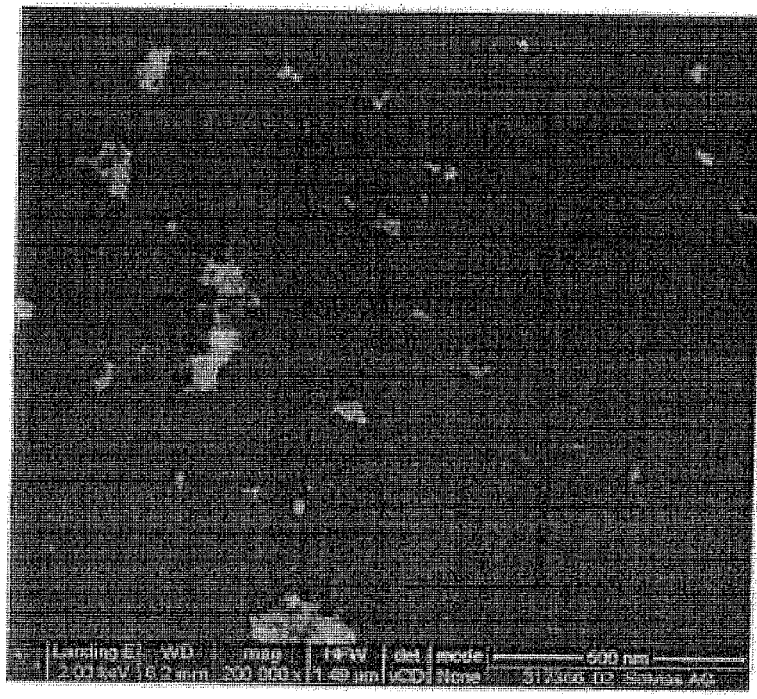
FIG. 2 shows a scanning electron microscope (SEM) image of nanoparticulate $SnO_2$ prepared starting from $SnCl_2$ (prior art).

FIG. 2 shows a scanning electron microscopic photograph of the precipitate formed from $SnCl_2$ under otherwise same experimental and measuring conditions as in FIG. 1. This precipitate is of highly irregular shape. It consists apparently of agglomerated particles of very small size. The diameter range of the particles is well below the diameter range of the above mentioned $SnO_2$ made from $SnF_2$. The unfavorable agglomeration of the particles is believed to be due to the presence of the chloride ions from the $SnCl_2$.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

EXAMPLES

In the following examples 1-8 a complete oxidation-reaction of $SnF_2$ is carried out in open reaction-containers, so the presence of atmospheric oxygen is allowed for. The fine nanoparticulate $SnO_2$ is collected by the use of micropore filter (cellulose nitrate micro pore filters) and the residuals on the filter are determined by gravimetry. The remaining content of $SnO_2$ in the aqueous filtrate is measured with XRF.

Example 1

Equimolar Amounts of Stannous Fluoride and Nitrite
(c/a=1; b and b/a>0)

Concentrations: $SnF_2$: 3.37, 33.7 mM, $NaNO_2$: 3.37, 33.7 mM

| mg $SnF_2$ | Volume Liter | Conc. Sn(II) ppm | mMoles/ Liter | mg $NaNO_2$ | mMoles/ Liter | mg precipitated $SnO_2$ | Yield % | ppm $SnO_2$ in solution |
|---|---|---|---|---|---|---|---|---|
| 528 | 1   | 400  | 3.37  | 232 | 3.36  | 470.8 | 92.7  | 81  |
| 528 | 0.1 | 4000 | 33.70 | 232 | 33.62 | 541.0 | 106.5 | 860 |

Example 2

Slight Excess of Nitrite over Stannous Fluoride
(c/a=1.2; b and b/a>0)

Concentrations: $SnF_2$: 3.37, 33.7 mM, $NaNO_2$: 4.03, 40.34 mM

| mg $SnF_2$ | Volume Liter | Conc. Sn(II) ppm | mMoles/ Liter | mg $NaNO_2$ | mMoles/ Liter | mg precipitated $SnO_2$ | Yield % | ppm $SnO_2$ in solution |
|---|---|---|---|---|---|---|---|---|
| 528 | 1   | 400  | 3.37  | 278.4 | 4.03  | 413.1 | 81.3 | 85  |
| 528 | 0.1 | 4000 | 33.70 | 278.4 | 40.34 | 410.2 | 80.8 | 771 |

Example 3

Slight Excess of Nitrite over Stannous Fluoride
(c/a=1.2; b and b/a>0)

Concentrations: $SnF_2$: 67.4, 134.8, 269.6 mM, $NaNO_2$: 80.7, 161.4, 322.8 mM

| mg $SnF_2$ | Volume Liter | Conc. Sn(II) ppm | mMoles/ Liter | mg $NaNO_2$ | mMoles/ Liter | mg precipitated $SnO_2$ | Yield % | ppm $SnO_2$ in solution |
|---|---|---|---|---|---|---|---|---|
| 1056 | 0.1   | 8000  | 67.40  | 556.8 | 80.69  | 986.9  | 97.2  | 1622 |
| 1056 | 0.05  | 16000 | 134.80 | 556.8 | 161.38 | 1034.4 | 101.8 | 2637 |
| 1056 | 0.025 | 32000 | 269.61 | 556.8 | 322.76 | 1021.2 | 100.5 | 4681 |

Example 4

Large Excess of Nitrite over Stannous Fluoride
(c/a=10; b and b/a>0)

Concentrations: $SnF_2$: 3.37, 6.74, 13.48 mM, $NaNO_2$: 33.6, 67.2, 134.8 mM

| mg $SnF_2$ | Volume Liter | Conc. Sn(II) ppm | mMoles/ Liter | mg $NaNO_2$ | mMoles/ Liter | mg precipitated $SnO_2$ | Yield % | ppm $SnO_2$ in solution |
|---|---|---|---|---|---|---|---|---|
| 106 | 0.2  | 400  | 3.37  | 464 | 33.62 | 109.9 | 108.2 | 2   |
| 106 | 0.1  | 800  | 6.74  | 464 | 67.24 | 110.2 | 108.5 | 2.7 |
| 106 | 0.05 | 1600 | 13.48 | 464 | 13.48 | 100.9 | 99.3  | 7.5 |

Example 5

Large Molar Excess of Stannous Fluoride over Nitrite (c/a=0.1; b and b/a>0)

Concentrations: $SnF_2$: 3.37, 6.74, 13.48 mM, $NaNO_2$: 0.337, 0.674, 1.348 mM

| mg $SnF_2$ | Volume Liter | Conc. Sn(II) ppm | mMoles/ Liter | mg $NaNO_2$ | mMoles/ Liter | mg precipitated $SnO_2$ | Yield % |
|---|---|---|---|---|---|---|---|
| 528 | 1 | 400 | 3.370 | 23.3 | 0.337 | 208 | 41.0 |
| 528 | 0.5 | 800 | 6.739 | 46.5 | 0.674 | 207.8 | 40.9 |
| 528 | 0.25 | 1600 | 13.479 | 93.0 | 1.348 | 286.4 | 56.4 |

Examples 6-7

Variable Molar Excesses of $SnCl_2$ over Nitrite; pH of Reaction Medium Variable, Adjusted Solely by the Varying Excesses of $SnCl_2$ A 10N aqueous $SnCl_2$ stock solution and a 10N aqueous $NaNO_2$ stock solution are prepared. Procedure for each example: A volume aliquot of the $NaNO_2$ stock solution (according to the following table) is placed in a 100 ml beaker and diluted with 25 ml water. Separately a volume aliquot of the $SnCl_2$ stock solution (according to the following table) is diluted with 25 ml water. The diluted $SnCl_2$ solution is added at once to the diluted $NaNO_2$ solution in the 100 ml beaker. Oxygen is not excluded, i.e. b>0, b/a>0.

| Example No. | Volume aliquot $NaNO_2$ stock solution (ml) | Volume aliquot $SnCl_2$ stock solution (ml) | c/a | Observations | Approx. pH of reaction solution |
|---|---|---|---|---|---|
| 6 | 1.0 | 2.2 | 1/2.2 = 0.455 | Immediate precipitate formation, re-dissolves after 1 hour | about 0.7 |
| 7 | 1.0 | 1.1 | 1/1.1 = 0.909 | Immediate precipitate formation, mostly re-dissolves after 1 hour, some sedimentation | about 0.9 |

In these two catalytic oxidation process examples (b>0, b/a>0) the salt $Sn^{2+}(X^{n-})_{2/n}$ may be $SnCl_2$ according to the invention. Here, the pH range of 0.7 to 0.9 appears to be the range where the $SnO_2$ starts to dissolve. Using a pH below that range should provide a clear solution containing only soluble stannic species. Using on the other hand a pH above that range should provide stably precipitated nanoparticulate $SnO_2$.

Examples 8-10

Variable Molar Excesses of $SnF_2$ over Nitrite; pH of Reaction Medium Variable, Adjusted by the Varying Excesses of $SnF_2$ Aqueous $SnF_2$ stocks solutions of variable concentration (according to the following table A) and a 0.2M aqueous $NaNO_2$ stock solution are prepared. Procedure for each example: 25 ml of the $NaNO_2$ stock solution are placed in a 100 ml beaker and 25 ml of the $SnF_2$ stock solution are added at once with mixing and shaking. Oxygen is not excluded.

TABLE A

| Example No. | Conc. of $SnF_2$ stock solution (M) | Approx. pH of $SnF_2$ stock solution before mixing with $NaNO_2$ solution | c/a | Observations | approximate final pH of reaction solution |
|---|---|---|---|---|---|
| 8 | 0.44 | 2.3 | 0.2/0.44 = 0.455 | Immediate precipitate formation, remains without further dissolution | about 3.8 |
| 9 | 0.22 | 2.9 | 0.2/0.22 = 0.909 | Immediate precipitate formation, remains without further dissolution | about 4.3 |
| 10 | 0.11 | 3.0 | 0.2/0.11 = 1.818 | Immediate precipitate formation, remains without further dissolution | about 4.7 |

Examples 8 and 9 are catalytic oxidation process examples (b>0, b/a>0) and example 10 is rather a stoichiometric oxidation process example due to the excess of nitrite, Weight aliquots of the homogeneous precipitate suspensions obtained from the examples 8-10 (according to the following table B) are contacted with just so much aqueous 40% wt HF solution (according to the following table B) such as to re-dissolve all the precipitate.

TABLE B

| Example No. | weight aliquot of homogeneous precipitate (g) | aqueous 40% wt HF solution (g) needed until full dissolution of precipitate |
|---|---|---|
| 8 | 2.21 | 0.14 |
|   | 5.01 | 0.48 |
|   | 10.05 | 1.13 |
| 9 | 2.25 | 1.48 |
|   | 5.03 | 2.52 |
|   | 10.05 | 5.06 |
| 10 | 2.24 | 1.76 |
|   | 5.05 | 2.73 |
|   | 10.04 | 5.38 |

It can be seen that the suspension of example 8, which after the oxidation had the lowest pH of 3.8, only requires rather low amounts of 40% HF solution to redissolve completely. The suspensions of examples 9-10 which had higher pH's of 4.3 and 4.7, respectively, after the oxidation, require more, but similar amounts of 40% HF solution to redissolve completely. This is indicative that if the oxidation process is run with $SnF_2$ as the starting salt $Sn^{2+}(X^{n-})_{2/n}$ then the precipitation of insoluble stannic species may be avoided if the pH is kept below a range of about 3.8 to 3.5. It is indicative on the other hand that if the pH is kept above that range then the insoluble stannic species precipitate essentially completely as nanoparticulate $SnO_2$.

The invention claimed is:

1. A process for oxidising $Sn^{2+}$ dissolved in an aqueous solution to stannic compounds using $NO_2^-$ and $O_2$ as oxidants, said dissolved $Sn^{2+}$ being $Sn^{2+}(X^{n-})_{2/n}$, wherein $X^{n-}$ denotes a counter anion and n is 1 or 2 wherein during said oxidation said aqueous solution is kept at a pH in the range of 0 to 7, and said $Sn^{2+}(X^{n-})_{2/n}$ and said oxidants are used according to the reaction scheme a $Sn^{2+}(X^{n-})_{2/n}$+b $O_2$+c $NO_2^-\rightarrow$stannic compounds in which scheme a, b and c are mole numbers; wherein c is 0.05 to 0.5 times of a, and b is greater than zero.

2. The process of claim 1, wherein b is at least equal to the difference a−c.

3. The process of claim 1 wherein $Sn^{2+}(X^{n-})_{2/n}$ is selected from the group consisting of $SnF_2$, $SnCl_2$, $SnBr_2$ and $SnI_2$.

4. The process of claim 3, wherein $Sn^{2+}(X^{n-})_{2/n}$ is $SnF_2$.

5. . The process of claim 1, wherein the pH is kept in the range of 0 to 3.5.

6. The process of claim 1, wherein the pH is kept in the range of 2.0 to 6.

7. The process of claim 6, wherein $Sn^{2+}(X^{n-})_{2/n}$ is $SnF_2$.

8. The process of claim 7, wherein the solution is purely aqueous.

9. The process of claim 8, which is performed at a temperature of 20 to 30° C.

* * * * *